United States Patent
McCann

[11] Patent Number: 5,977,740
[45] Date of Patent: Nov. 2, 1999

[54] BRAKE-BY-WIRE SYSTEM WITH SWITCHED RELUCTANCE MOTOR CONTROLLER

[75] Inventor: Roy A. McCann, Kettering, Ohio

[73] Assignee: ITT Manufacturing Enterprises, Inc., Wilmington, Del.

[21] Appl. No.: 08/996,682

[22] Filed: Dec. 23, 1997

Related U.S. Application Data

[63] Continuation-in-part of application No. 08/856,370, May 14, 1997, Pat. No. 5,838,133.
[51] Int. Cl.[6] ................................................. H02P 5/05
[52] U.S. Cl. ................................. 318/701; 318/254
[58] Field of Search ................................. 318/254, 439, 318/685, 696, 700, 701

[56] References Cited

U.S. PATENT DOCUMENTS

| | | | |
|---|---|---|---|
| 4,707,650 | 11/1987 | Bose | 318/685 |
| 5,012,171 | 4/1991 | Sember | 318/696 |
| 5,563,488 | 10/1996 | Stephenson et al. | 318/701 |
| 5,637,974 | 6/1997 | McCann | 318/701 |

*Primary Examiner*—Bentsu Ro
*Attorney, Agent, or Firm*—J. Gordon Lewis

[57] ABSTRACT

A motor control system selectively energizes a motor winding to maximize the motors efficiency and output torque under conditions of varying rotor speed, winding temperature, and supply voltage. Motor output requirement values and sensor output is used to develop independent parameters in the translation and dilation domain from which optimal turn-on and turn-off or "conduction angles" are developed. The optimal conduction angles are processed by circuitry to generate actuation signals that selectively control the delivery of energy to the motor winding.

14 Claims, 8 Drawing Sheets

BRAKE-BY-WIRE SYSTEM WITH SWITCHED RELUCTANCE MOTOR CONTROLLER

CROSS REFERENCE

This application is a continuation-in-part of patent application Ser. No. 08/856,370 filed on May 14,1997, now U.S. Pat. No. 5,838,133, issued Nov. 11, 1998.

FIELD OF THE INVENTION

The invention relates to a brake-by-wire system with a switched reluctance motor (SRM) controller for controlling the delivery of power to the motor to maximize its efficiency and output torque by optimizing the motor's phase current turn-on and turn-off (conduction) angles under conditions of varying rotor speed, winding temperature, and supply voltage.

BACKGROUND OF THE INVENTION

A motor driven brake-by-wire system typically operates in one of two braking modes: 1) normal braking; or 2) emergency intervention braking. In normal braking, the vehicle's brake system controller outputs slowly modulated brake commands to a brake-by-wire motor controller in direct response to driver-generated input signals from a brake-pedal force and brake travel sensor. During normal braking mode, the motor's output torque efficiency is maximized to enable the motor to output moderate torque levels over relatively long periods of time at low power consumption rates.

In contrast, a brake-by-wire motor controller system in emergency intervention braking mode responds to an output torque command from the vehicle's brake system controller based upon a variety of vehicle sensor inputs. The emergency intervention braking mode of pulsing the brake caliper to avoid tire skid or wheel lock during ABS, operation, for example, is characterized by large output torque demands from the brake-by-wire motor applied over relatively short time intervals. During emergency intervention braking mode, lower motor output torque efficiency is accepted as a trade-off to improve the brake-by-wire system's ability to closely track variable torque output commands under adverse conditions such as sudden fluctuations in motor supply voltage and high coil temperatures.

An ideal control system for a SRM driving a brake-by-wire system would enable the SRM to deliver output torque dynamically despite variations in multiple system parameters such as motor speed, motor supply voltage, and motor coil temperature. To accomplish this goal, a simplified method is needed for determining the optimum angular position of the SRM's rotor at which to energize and de-energize the phase windings of the stator, so called "turn-on" and "turn-off" angles or, collectively, the "conduction angles." Various complex schemes exist for selecting the optimal conduction angles that maximizes the SRM's output torque and operating efficiency despite variation in its instantaneous operating speed. The present invention provides a system that simplifies the determination of optimal conduction angles that compensate for variations in the motor's rotor speed as well as variations in the motor's supply voltage and operating temperature that arise as a result of changing load conditions and coil resistance.

Traditionally, selection of an optimal turn-on angle can be made independently from the selection of an optimal turn-off angle only for the case in which the motor is operating at low speed using "flat-top" current control. Flat-top current control is characterized by a phase current vs. time function in which no significant time delay exists between the instant in time that the phase current (i.e., the current that runs through the stator's phase windings) is turned-on and the instant it reaches its maximum phase current value. Similarly, no significant time delay exists between the instant in time that the phase current is turned-off and when it reaches a zero value.

More complicated phase current control schemes that determine conduction angles that optimize the motor's output torque and efficiency for cases of higher and/or variable speed motor operation typically employ lengthy look-up tables that require the processing power of a microcontroller to access. The highly coupled relationship between the turn-on and turn-off angles in traditional high speed motor control schemes complicates their determination. If additional system conditions or parameters such as variations in the motor's coil resistance and the motor's supply voltage are considered, determination of optimal turn-on and turn-off angles is further complicated. The present invention provides a simplified system for determining optimized conduction angles for SRMs operating under varying conditions.

SUMMARY OF THE INVENTION

The present invention is a system for selectively energizing a motor winding that uses motor output requirement values and sensor output to develop parameters in the translation and dilation domain from which optimal conduction angles are developed. The optimal conduction angles are used to generate actuation signals to selectively control the delivery of energy to the motor winding.

DETAILED DESCRIPTION OF THE PREFERRED EMBODIMENT

Figure 3:
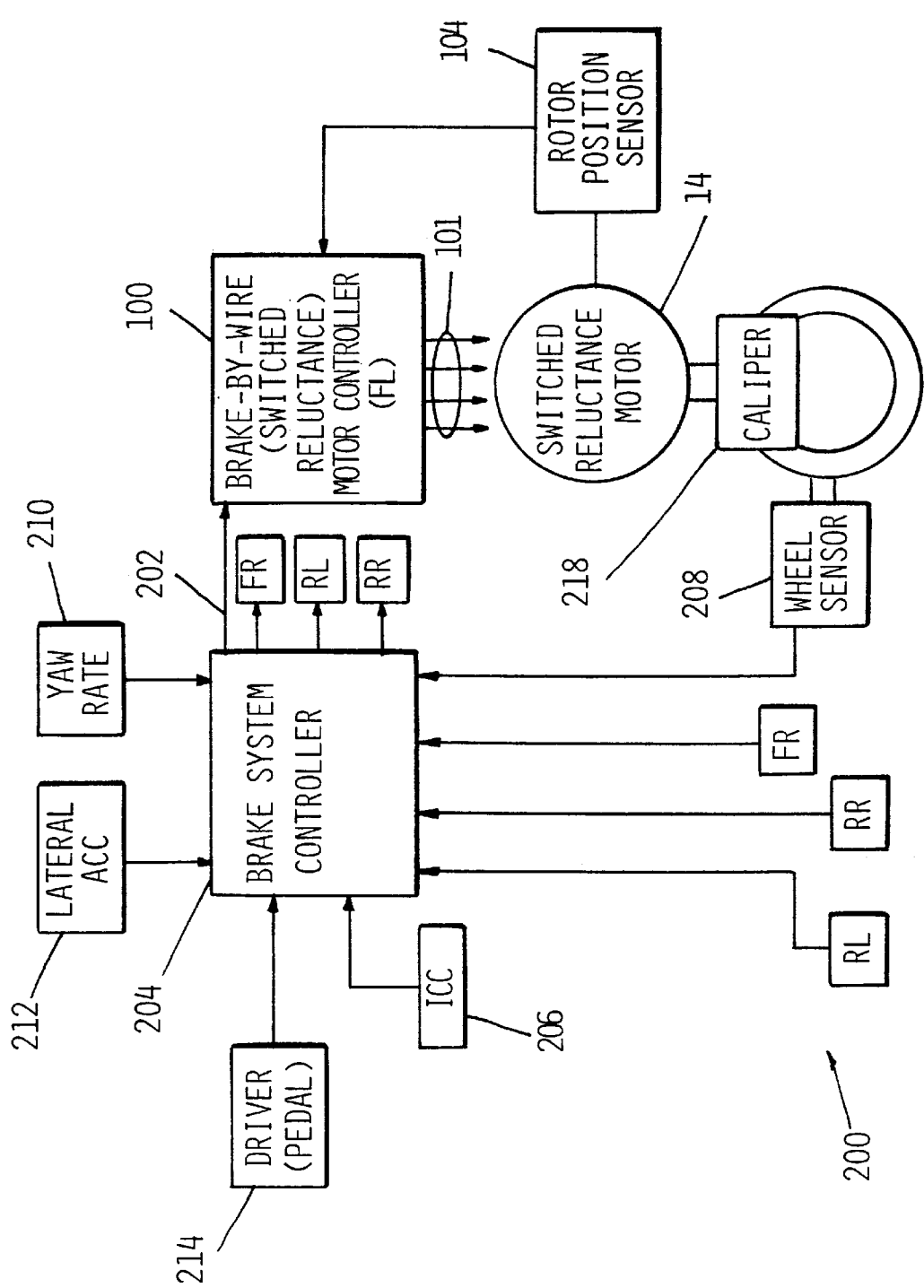
FIG. 3 is a block diagram depicting a brake-by-wire system driven by a SRM.

Referring now to the drawings in which the same numeral represents the same component among the several views, FIG. 3 shows the front-left (FL) channel of a brake-by-wire system 200 driven by a SRM 14 that is controlled by a brake-by-wire motor controller 100. In response to control signals 101 from the SRM controller 100, the SRM 14 outputs torque to actuate the vehicle's braking member housed within the brake caliper 218. Control signals from the SRM controller 100 are developed based on an input torque command 202 from the vehicle's brake system controller 204 and input from the SRM's 14 rotor position sensing element 104. The remaining three other channels, front-right (FR), rear-right (RR), and rear-left (RL), operate in a manner that is similar to the FL channel.

The brake system controller 204 develops the input torque command 202 based on various inputs, the number of which depends upon the level of sophistication of the brake-by-wire system 200. Output torque commands from brake system controllers 204 that provide high level functionalities such as Automotive Stability Management System (ASMS), Intelligent Cruise Control (ICC), or Panic Brake Aid (PBA) are developed from multiple input signals from sensors that may monitor:

1. intelligent cruise control (ICC) 206
2. wheel speed 208
3. yaw rate 210
4. lateral acceleration 212; or
5. brake pedal force and travel 214.

The ideal motor for a brake-by-wire system 200 of this level of sophistication would respond quickly and accurately to input torque commands 202 in spite of widely ranging variations in motor speed, motor temperature, and motor supply voltage.

Figure 1:
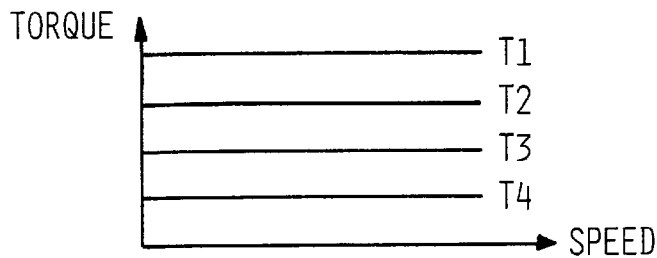
FIG. 1 is a graph representing an ideal motor's output torque as a function of speed.
Figure 2:
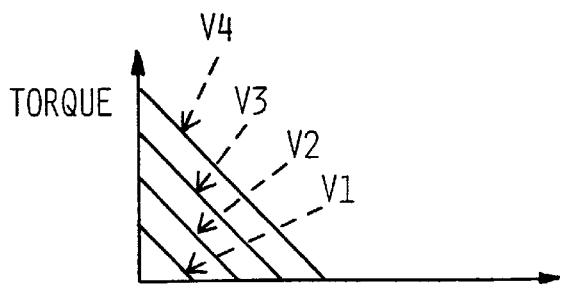
FIG. 2 is a graph representing a real motor's output torque as a function of speed.

As shown in FIG. 1, the ideal torque characteristic of a brake-by-wire motor as a function of motor speed is a constant value, i.e., torque output is independent of motor speed. Similarly, the ideal brake-by-wire system motor would deliver constant output torque values regardless of varying motor temperatures and motor supply voltages. In contrast, the torque-speed characteristic of a real motor of the type currently used in brake-by-wire systems is dependent on motor speed as shown in FIG. 2. $V_1$ through $V_4$ represent the motor's 14 torque-speed characteristic under varying supply voltage conditions.

Figure 4:
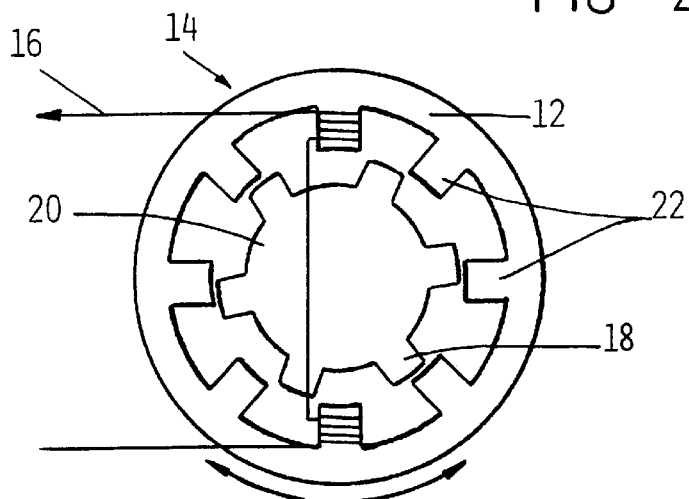
FIG. 4 is a partial cross-sectional view of a SRM.

Referring now to FIG. 4, basic operation of a SRM is explained using a four-phase configuration as an example. A four-phase SRM has eight stator poles 22 on its stator 12 and six rotor poles 18 on its rotor 20. Each pair of diametrically opposite stator poles 22 is connected by a winding that forms one "phase" 16 of the four phases of the motor 14. The rotor poles 18 have no windings. The motor's 14 output torque is produced by sequentially switching current through each of the stator phase windings 16. The magnetic field that results from energizing a stator phase winding 16 magnetically attracts the stator's nearest neighboring rotor pole 18 causing the rotor 20 to rotate. To prevent any repulsion or "braking torque" from being produced, the stator's phase current is switched off as the rotor 20 approaches the position in which the attracted rotor pole 18 becomes aligned with the attracting stator pole 22. Once the angular momentum of the rotor 20 has caused it to rotate past the aligned position, the phase current may be switched on again to produce more output torque.

The output torque and operating efficiency of a SRM 14 may be maximized by optimizing the magnitude of the current in each stator phase winding 16 during the portion of the switching cycle in which the inductance of the windings 16 increases. This principle may be demonstrated by analyzing the equivalent circuit of a SRM 14, shown in FIG. 5. The relationship between the current flowing through the phase winding 16 and the magnetic flux linked by that winding 16 is:

$$\lambda(\theta,i)=L(\theta)i(t) \quad (1)$$

where $\lambda$ is the flux linkage, i(t) is the phase current, and L is the angular position of the rotor 20. The voltage relationship at the phase terminal is:

$$v(t) = i(t)R + \frac{d\lambda}{dt} \quad (2)$$

where v(t) is the applied phase voltage from the motor's drive circuit and R is the circuit resistance. Evaluating the derivative yields:

$$v(t) = i(t)R + L(\theta)\frac{di}{dt} + i(t)\frac{dL}{d\theta}\frac{d\theta}{dt} \quad (3)$$

Noting that the rotor speed is the time derivative of the rotor position, equation (3) may be written as:

$$v(t) = i(t)R + L(\theta)\frac{di}{dt} + i(t)\frac{dL}{d\theta}\omega \quad (4)$$

$K_V$ is a voltage parameter, or "back emf constant", that appears at the terminal. It is a time-varying inductance that is a function of the angular position of the rotor 20:

$$K_V = i(t)\frac{dL}{d\theta} \quad (5)$$

Figure 5:
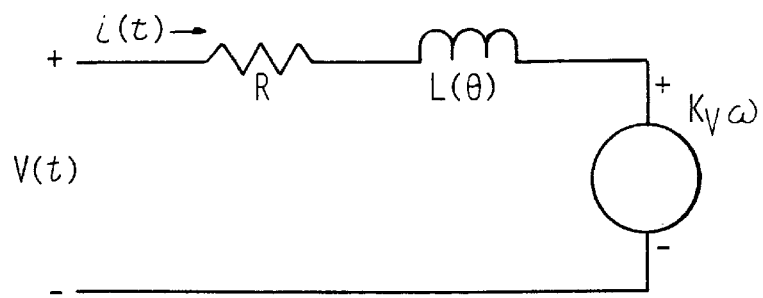
FIG. 5 is a schematic representation of an equivalent circuit for a stator phase winding.

The resulting electromagnetic torque generated by the circuit of FIG. 5 may be approximated by the expression:

$$T = \frac{1}{2}K_V i(t) \quad (6)$$

Thus, the motor torque is related directly to $K_V$. Note that positive torque is produced when the inductance is increasing ($dL/d\theta>0$) as current flows through the phase winding 16. In general, the relationship given in equation (6) varies with the motor phase conduction period, the period of time during which i(t) is nonzero. Thus, the torque expression of equation 6 could also be written as:

$$T=K_T i(t) \quad (7)$$

It should be noted that equations (1)–(7) are written for a single phase because most SRMs 14 are designed such that there is no mutual coupling between phases so that mutual coupling effects between the multiple phases may be neglected.

The value of $K_V$ can be varied by modifying the conduction period or the range of rotor positions for which I(t) is nonzero. But variation of $K_V$ also effects the value $K_T$. In general, decreasing $K_V$ while holding $K_T$ constant increases the maximum power available from the output shaft of the motor 14 but reduces the overall efficiency of the motor 14 due to increased resistance losses. Increasing $K_T$ while holding $K_V$ constant minimizes the power consumption of the motor 14 and provides more torque to the motor's load. Thus, controlling the motor by modifying the conduction period in a brake-by-wire system seems desirable in applying a SRM effectively to both normal and emergency intervention braking modes, but such control is difficult to achieve in practice because of the mutual dependency of $K_T$ and $K_V$, i.e., both vary with variation of the conduction period. The present invention simplifies the difficult task of defining a system in which $K_V$ and $K_T$ can be modified independently.

To begin, a transformation is defined between the phase turn-on and turn-off angles, used by the motor's drive circuit to control the delivery of energy to the motor 14, and a new set of variables to modify $K_T$ and $K_V$:

$$K_T = \hat{K}_T \delta \quad (8)$$

$$K_V = \hat{K}_V \tau$$

This transform allows the designer to determine $K_T$ and $K_V$ independently through the use of controlled variables $\delta$ and $\tau$ where: 1) dilation $\lambda$ is the conduction angle duration in radians, which correlates directly to the motor's output torque; and 2) translation $\tau$ is the phase advance of the conduction period in radians, which correlates directly to the motor's efficiency.

In general, such a transformation may be defined as:

$$\begin{bmatrix} \delta \\ \tau \end{bmatrix} = \begin{bmatrix} a_{11} & a_{12} \\ a_{21} & a_{22} \end{bmatrix} \begin{bmatrix} \theta_{on} \\ \theta_{off} \end{bmatrix} \quad (9)$$

Which has the inverse transformation of:

$$\begin{bmatrix} \theta_{on} \\ \theta_{off} \end{bmatrix} = \begin{bmatrix} a_{11} & a_{12} \\ a_{21} & a_{22} \end{bmatrix}^{-1} \begin{bmatrix} \delta \\ \tau \end{bmatrix} \quad (10)$$

Although many transformation value sets may be defined that are suitable for a variety of applications and motor configurations, one particularly useful set for a SRM 14 used in a brake-by-wire application is:

$$\begin{bmatrix} \delta \\ \tau \end{bmatrix} = \begin{bmatrix} -1 & 1 \\ \frac{1}{2} & \frac{1}{2} \end{bmatrix} \begin{bmatrix} \theta_{on} \\ \theta_{off} \end{bmatrix} \quad (11)$$

Which has the inverse transformation of:

$$\begin{bmatrix} \theta_{on} \\ \theta_{off} \end{bmatrix} = \begin{bmatrix} \frac{-1}{2} & 1 \\ \frac{1}{2} & 1 \end{bmatrix} \begin{bmatrix} \delta \\ \tau \end{bmatrix} \quad (12)$$

This transform maps the coordinates of the conduction angles in the $\theta$ on/off plane into the $\delta$-$\tau$ plane using eigen vectors $[-0.96, 0.27]$-$\tau$ and $[-0.49, 0.97]$.

The brake-by-wire motor controller 100 of FIG. 3 can be optimized in the $\delta$-$\tau$ plane to operate the SRM 14 in a manner that maximizes the motor's 14 output torque and operating efficiency despite variations in the motor's 14 operating speed, coil temperature and supply voltage by selecting $\delta$-$\tau$ parameters that yield torque output approximating the idealized torque-speed characteristics shown in FIG. 1. As described below, the present system is defined in such a way that only 15 parameters, $K_1 \ldots K_{15}$, (defined in equations 13 and 14) must be determined for optimization. In contrast, conventional motor control schemes that compensate only for variations in motor speed employ expensive microprocessor-based technology for accessing look-up tables that may be up to 1200 entries long.

Although many hardware implementations of the present invention's optimizing scheme may designed using analog and discrete digital components, one advantageous implementation uses microprocessor-based technology with software control, which is generally easier to construct and easier to maintain and which greatly reduces development cycle time. The simplified control scheme of the present invention advantageously allows the use of a microprocessor with reduced memory size and cycle times, which reduces costs significantly.

The independent or "decoupled" character of the $\delta$-$\tau$ parameters is explained with reference to FIGS. 6 and 7. Where:

t=time in secs
i=phase current in Amps
1/r =frequency in 1/secs
T=period of i waveform in secs
$\delta$=conduction angle duration in radians
$\tau$=phase translation of the conduction period in radians
$\theta_i$=conduction angle period in radians.
$\theta_{on}$=conduction angle turn-on instant in radians.
$\theta_{off}$=conduction angle turn-off instant in radians.

Figure 6A:
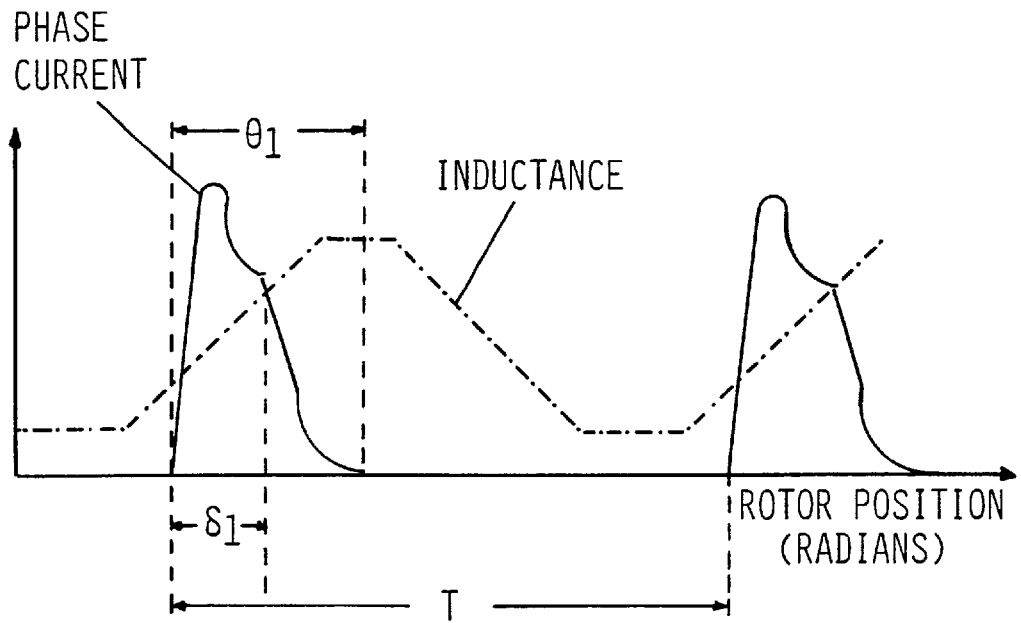
FIGS. 6A and 6B are graphs depicting phase current i in amps as a function of time t in secs.
Figure 6B:
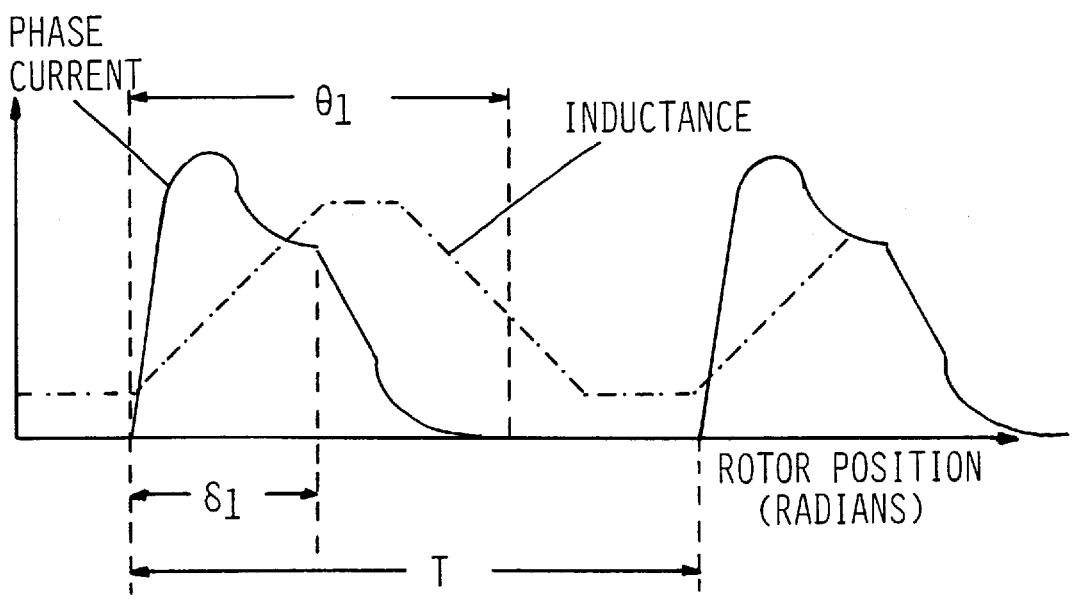

The graphs in FIGS. 6A and 6B demonstrate that while an increase in dilation (the conduction angle duration in radians) increases the conduction period $\theta i$, the increase in dilation $\delta$ from the $\delta_1$ value in FIG. 6A to the $\delta_2$ value in FIG. 6B does not affect the frequency 1/T of $i_\phi$, the phase current, waveform, i.e., the motor continues to operate at a constant speed while the conduction period $\theta_i$, which relates directly to the motor's output torque, is increased.

Figure 7A:
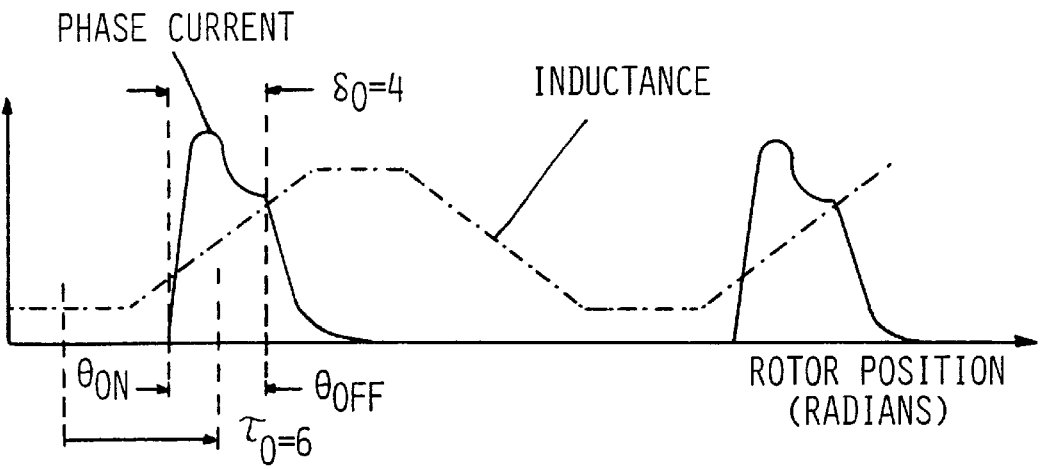
FIGS. 7A, 7B and 7C are graphs depicting phase current i as a function of rotor angle in radians.
Figure 7B:
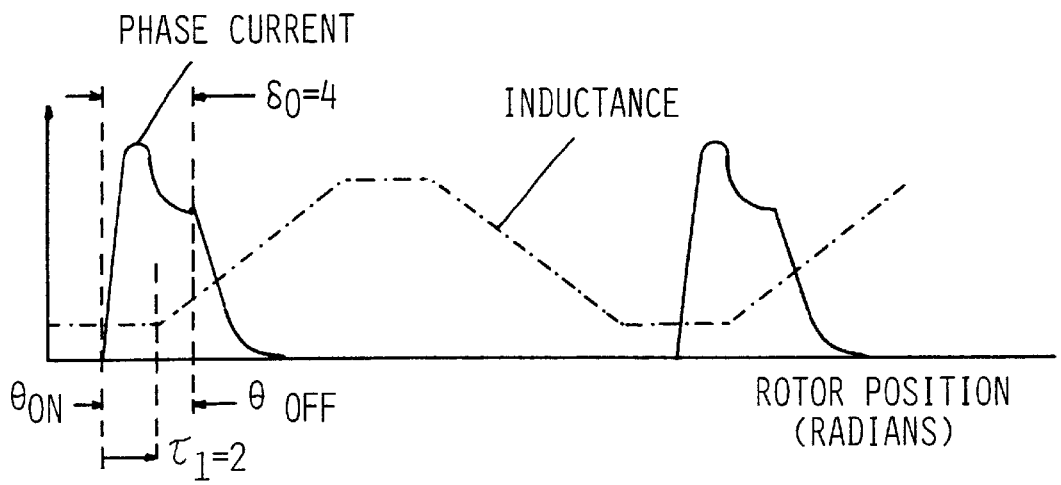
Figure 7C:
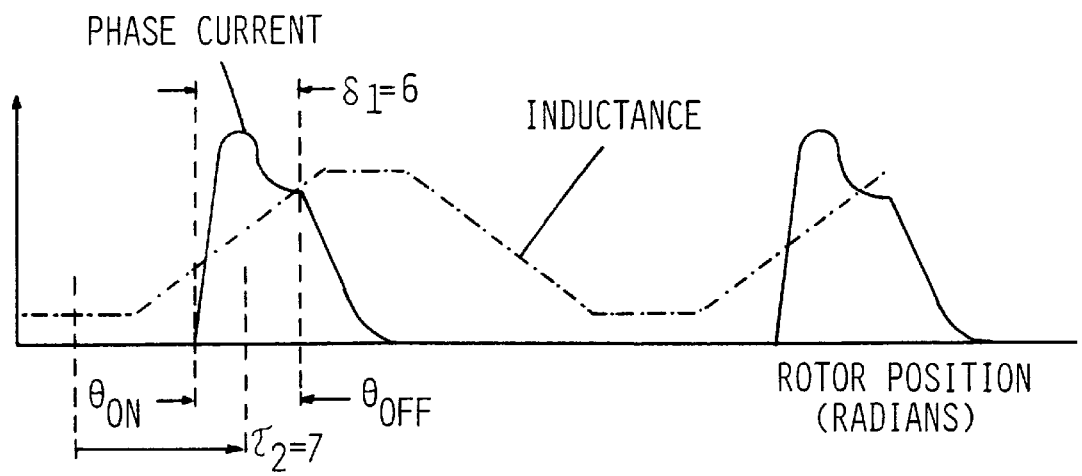

The graphs in FIGS. 7A and 7B demonstrate that the value of the translation parameter $\tau$ (the phase advance of the conduction period in radians) can change from $\tau_0=6$ in FIG. 7A to $\tau_1=2$ in FIG. 7B even though the value of dilation $\delta_0=4$ (the conduction angle duration in radians) remains the same. The translation $\tau$ value should be selected to increase the motor's efficiency by optimizing the magnitude of the current through the stator phase winding 16 during the portion of the switching cycle in which the inductance of the winding 16 is increasing, as shown in FIG. 7B. In contrast, the translation $\tau$ values selected in the graphs in FIGS. 7B and 7C yield less than optimal motor efficiency because the conduction period $\theta_i$ occurs during the non-increasing portion of the inductance profile thus failing to harness this energy to run the motor.

Figure 8:
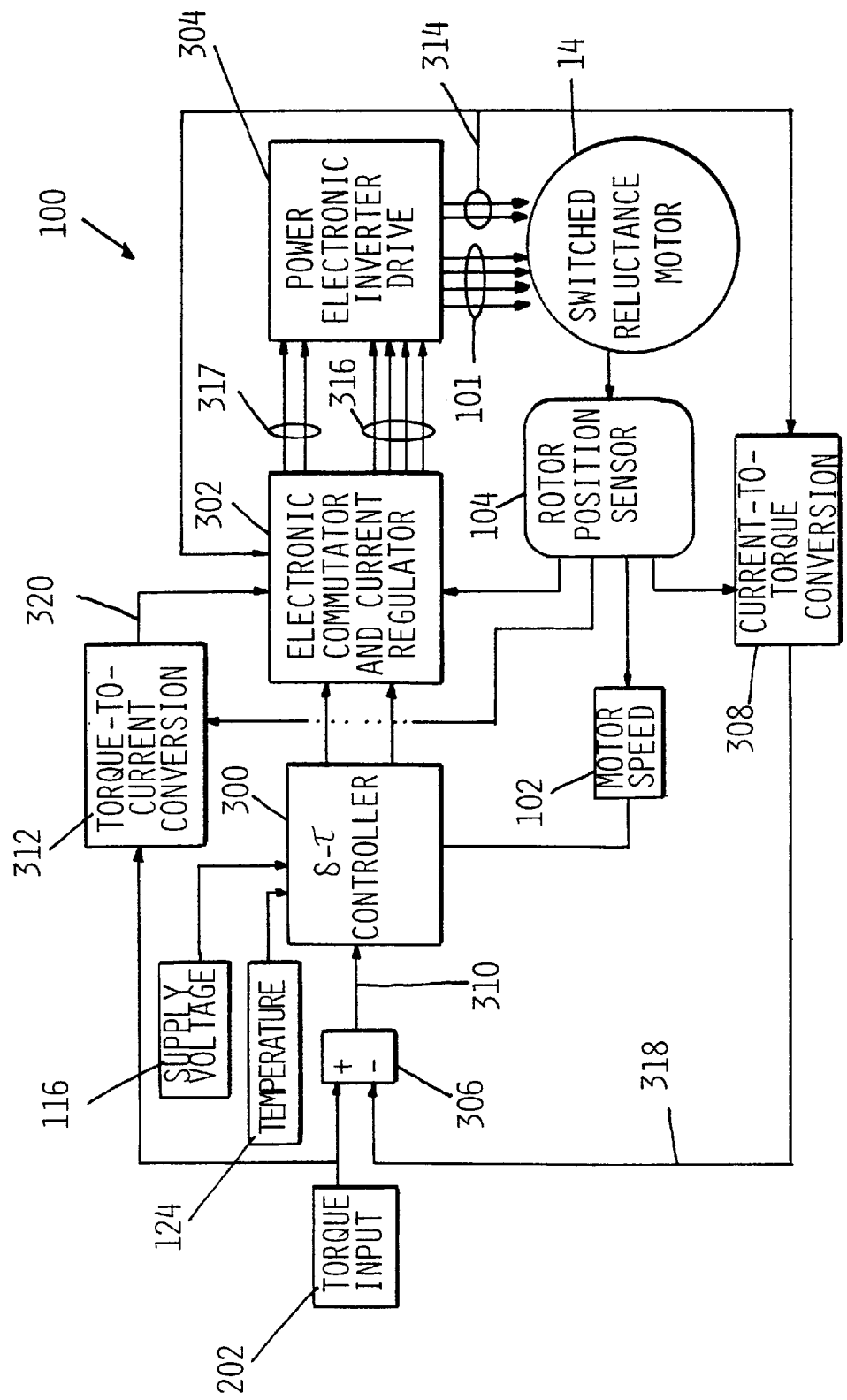
FIG. 8 is block diagram depicting the improved brake-by-wire SRM controller.

Referring now to FIG. 8, the improved motor controller 100 of the brake-by-wire system 200 depicted in FIG. 3 comprises the $\delta$-$\tau$ parameter controller 300, the electronic commutator and current regulator 302, and the power electronic inverter drive 304, which are implemented in the preferred embodiment using a Texas Instruments TMS320C240 programmable digital signal processor. The torque comparator 306 compares the input torque command 202 from the brake system controller 204 shown in FIG. 3 to the measured torque 318 from the current-to-torque conversion 308 to develop a torque error signal 310. The current-to-torque conversion 308 develops the measured torque signal 318 based on measured current signals 314 from the power electronic inverter drive 304 and the angular position of the rotor 16 from the rotor position sensor 104. Minimizing the torque error signal 310 provides nearly optimum tracking of the input torque command 202 and minimizes any potential disturbance introduced by variations in the supply voltage 116 and the motor speed 102 and by variations in the resistance through the windings 16 due to temperature fluctuations.

The torque error signal 310 is input to the $\delta$-$\tau$ parameter controller 300 along with the measured vehicle supply 116 and motor temperature 124 voltages and the motor speed signal developed by the motor speed generator 102 based on the rate of change of the angular position of the rotor 20 from the rotor position sensor 104. Motor speed signal 102 in radians/second is determined by the Texas Instruments TMS 320C240, which numerically differentiates a pulse train coming from the rotor position sensor 104. The expression ω(n)=h(θ(n)−θ(n−1)) where θ(n)−e(n−1) is used to define the number of encoder pulses that occur during the time sampling interval $h^{-1}$. In the preferred embodiment of the brake-by-wire system 200, driven by a SRM 14 with eight stator poles and six rotor poles, the rotor position sensor 104 is an incremental position encoder that produces 768 pulses per revolution or 128 pulses per each electrical period.

The input torque command 202 and the angular position of the rotor 14 from the rotor position sensor 104 are input to the torque-to-current conversion 312, which outputs current signal 320 to the electronic commutator and current regulator 302. The current-to-torque conversion 308 and torque-to-current 310 conversions are implemented in the preferred embodiment as a look-up tables stored in the program memory of the Texas Instruments TMS 320C240.

Output from the δ-τ parameter controller 300 (translation 134 and dilation 138 parameters), measured current signal 314 from the electronic commutator and current regulator 302, and the angular position of the rotor 20 from the rotor position sensor 104 are input with the command current signal 320 from the torque-to-current conversion 312 to the electronic commutator and current regulator 302. The electronic commutator and current regulator 302 develops switching state signals 316 that are sent to the power electronic inverter drive 304. Measured current signals 314 are used by the electronic commutator and current regulator 302 to ensure that the outputted switching states 316 track the requested current values of the current command signal 320. The output of the power electronic inverter drive 304 selectively energizes and de-energizes the multiple phases of the SRM 14 sequentially to produce motor torque that applies a clamping force to the wheel brake rotor housed within the brake caliper 218 shown in FIG. 3.

Figure 9:
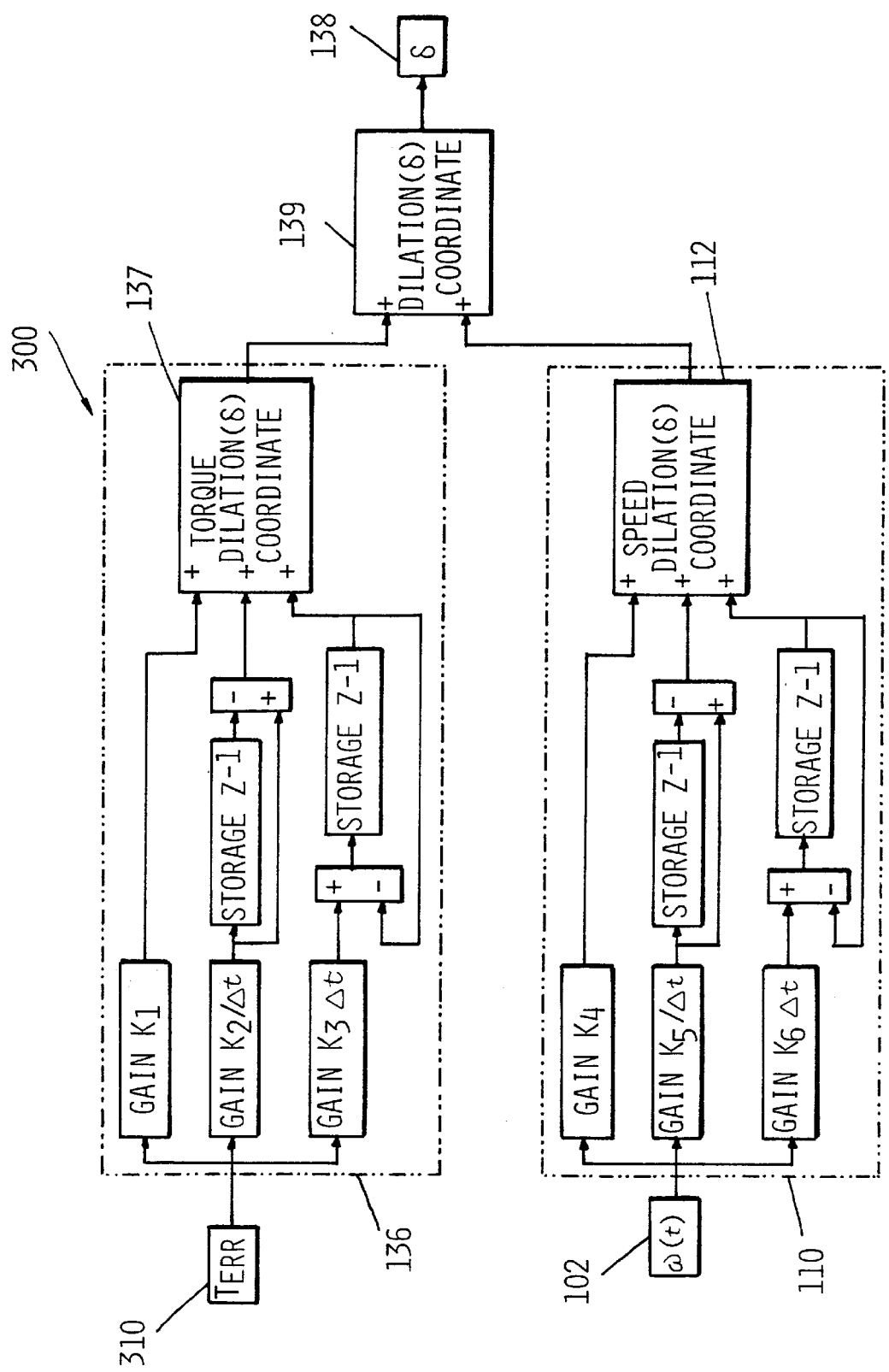
FIG. 9 is a block diagram depicting the development of the $\delta$ parameter within the $\delta$-$\tau$ controller of FIG. 8.

Referring now to FIG. 9, the operation of the δ-τ parameter controller 300 shown in FIG. 8 is described in greater detail. In the preferred embodiment, the δ-τ controller 300 is implemented in software that runs in the TMS320C240. The dilation parameter δ 138 is developed by inputting signals from torque dilation compensator 136 and speed dilation compensator 110 into the dilation parameter summer 139. The output of the dilation parameter summer 139, the dilation parameter δ 138, may be represented mathematically by the expression:

$$v_\delta = K_1 e_T + K_2 \frac{d e_T}{d t} + \quad (13)$$
$$K_3 \int_0^t e_T(\xi)d\xi + K_4 e_\omega + K_5 \frac{d e_\omega}{d t} + K_6 \int_0^t e_\omega(\xi)d\xi$$

In the preferred embodiment, torque dilation compensator 136 and speed dilation compensator 112 are implemented using a discrete time proportional-integral-differential functions (PID) and a sampling time increment Δt of 100 μS in software running in the TMS320C240. As shown in FIG. 9 and expression 13, the dilation parameter δ 138, contains design constants $K_1$, through K6 that are produced by the torque 136 and speed 110 dilation compensators. Calculation of the derivative term is performed numerically using memory registers within the TMS320C240 and a delay operator $z^{-1}$ of time Δt. Dilation parameter summer 139 is also implemented in software that runs in the TMS320C240.

Figure 10:
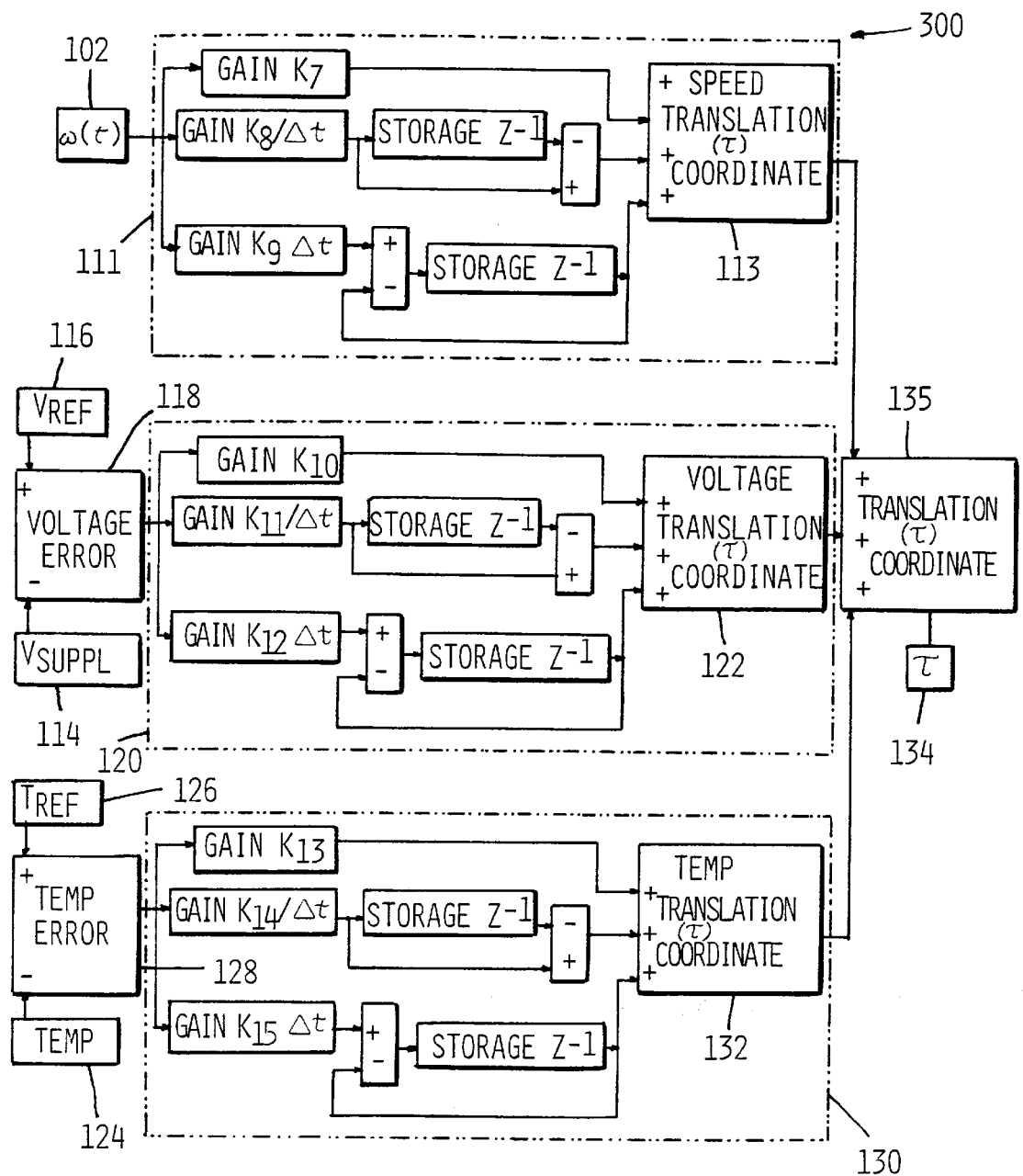
FIG. 10 is a block diagram depicting the $\tau$ translation parameter within the $\delta$-$\tau$ controller of FIG. 8.

Referring now to FIG. 10, the translation coordinate τ 134 is developed in similar fashion by inputting signals from speed 111, voltage 120 and temperature 130 translation compensators into the translation parameter summer 135. The output of the translation parameter summer 135, the translation coordinate τ 134, may be represented mathematically by the expression:

$$v_\tau = K_7 e_\omega + K_8 \frac{d e_\omega}{d t} + K_9 \int_0^t e_\omega(\xi)d\xi + K_{10} e_v + K_{11} \frac{d e_v}{d t} + \quad (14)$$
$$K_{12} \int_0^t e_v(\xi)d\xi + K_{13} e_T + K_{14} \frac{d e_T}{d t} + K_{15} \int_0^t e_T(\xi)d\xi$$

As shown in equation 14, the translation parameter τ 134, contains constants $K_7$, through $K_{15}$ that are produced by the speed 111, voltage 120 and temperature 130 translation compensators.

The output of the speed translation compensator 113 represents the portion of the translation parameter τ 135 that compensates for variations in operating speed. To develop this output, the SRM 14 is assumed to be operating at a speed dependent upon load conditions. The motor's speed 102 is input to the speed translation compensator 111, which develops three term signals that are sent to a speed translate term summer 113 within the speed translation compensator 111 to yield a voltage signal representing speed translate term containing the design constants $K_7$, $K_8$ and $K_9$. In the preferred embodiment, the speed translation compensator 113 is a proportional-integral-differential (PID) function implemented in software running in the TMS320C240.

The output of the voltage translation compensator 120 represents the portion of the translation parameter τ 134 that compensates for variations in the motor's supply voltage. To develop this output, a voltage signal from the motor's instantaneous supply voltage 114 and a reference supply voltage 116 generated by a constant voltage source are input to the voltage difference function 118 that generates a supply voltage error signal representing the deviation of the measured supply voltage 114 of the motor from the predetermined reference voltage 116. The supply voltage error signal is input to the voltage translation compensator 120, which outputs three term signals that are input to a voltage translate term summer 122 within the voltage translation compensator 120 to yield a voltage signal representing the voltage translate term containing the design constants $K_{10}$, $K_{11}$ and $K_{12}$. In the preferred embodiment, the voltage translation compensator 120 is a proportional-integral-differential (PID) function implemented in software running in the TMS320C240.

The output of the temperature translation compensator 130 represents that portion of the translation parameter τ 134 that compensates for variations in the motor's operating temperature. To develop this output, a measured temperature voltage signal from the motor's stator 12 obtained from a temperature sensing element 124 and a predetermined reference temperature voltage signal 126 generated by a constant voltage source are input to a temperature difference function 128 that generates a temperature voltage error signal representing the deviation of the motor's measured operating temperature 124 from the predetermined reference operating temperature 126. The preferred embodiment uses positive coefficient device KTY82-2 from National Semiconductor as the temperature sensing element 124 located in the vicinity of the stator windings 16.

The temperature error signal is input to a temperature translation compensator 130 that outputs three term signals that are input to the temperature translate term summer 132 within the temperature translation compensator 130 to yield a voltage signal representing the temperature translate term and containing the design constants $K_{13}$, $K_{14}$ and $K_{15}$. In the preferred embodiment, the temperature translation compensator 130 is a proportional-integral-differential (PID) function implemented in software running in the TMS320C240.

The dilation parameter δ 138 developed from the output of torque 136 and speed 110 dilation compensators and the translation parameter τ 134 developed from the output of the speed 111, voltage 120, and temperature 130 translation compensators are input to the electronic commutator and current regulator 302. The constants $K_1 \ldots K_{15}$ in equations (13) and (14) determine the dynamic response of the controller 100 to transients. These K parameters are design variables that may be varied to impart different operating characteristics to the various SRM configurations (e.g., three phase—6/4 stator-rotor poles, four phase—8/6 stator-rotor poles . . . ) and provide a means to optimize in the δ-τ plane the control of the SRM 14 in a manner that maximizes the motor's 14 output torque and operating efficiency despite variations in the motor's 14 operating speed, coil temperature and supply voltage. Values for constants $K_1 \ldots K_{15}$ are selected that yield actual torque output characteristics approximating the idealized torque-speed characteristics shown in FIG. 1.

Figure 11:
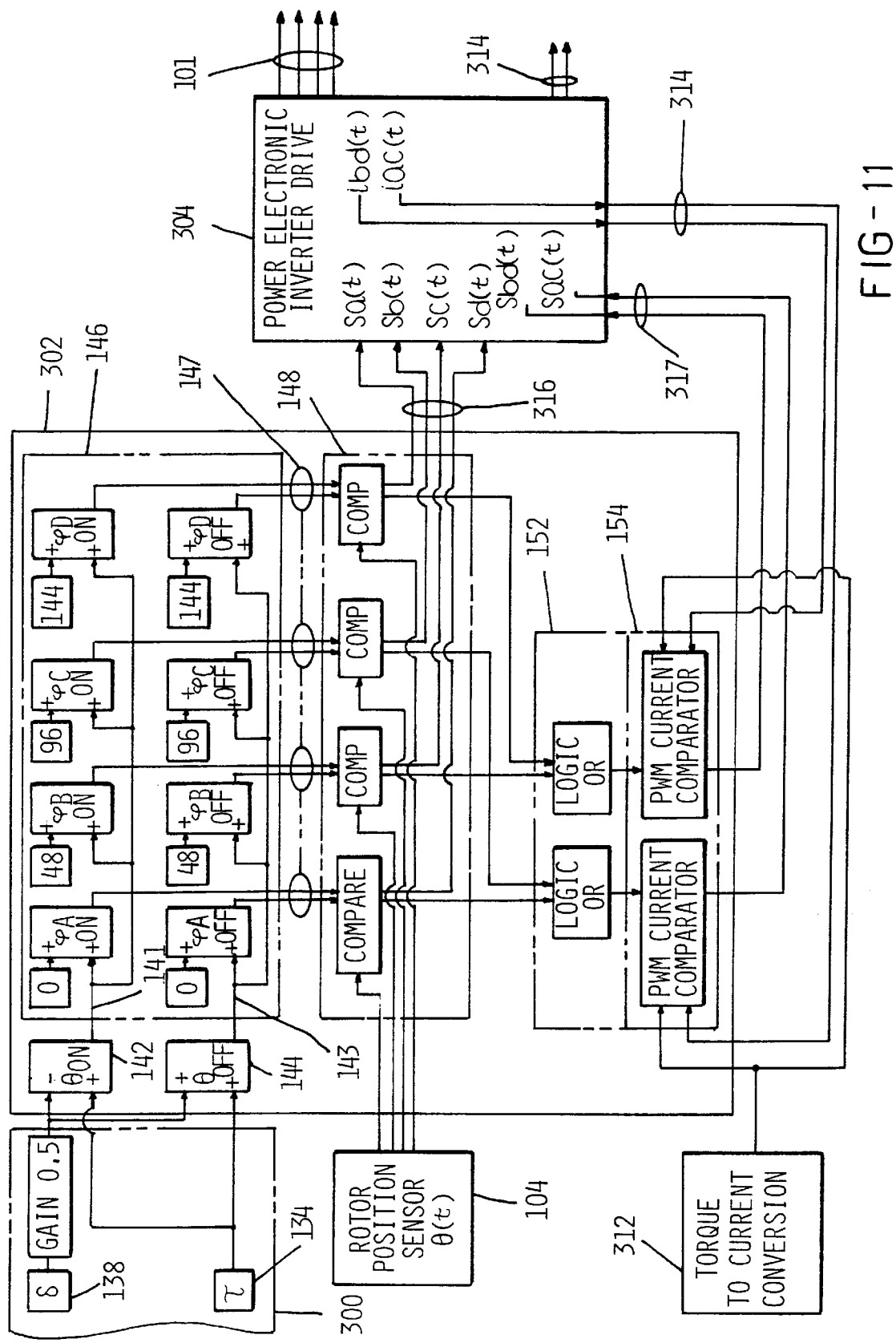
FIG. 11 is a block diagram depicting the electronic commutator and current regulator of FIG. 8.

Referring now to FIG. 11, the operation of the electronic commutator and current regulator 302 is described in greater detail. The electronic commutator and current regulator 302 converts the dilation δ 138 and the translation τ 134 parameters to the values in the $\theta_{on}$ and $\theta_{off}$ domain in accordance with the transform of equation 12 then uses these values to develop switching functions 316 that are output to the power electronic inverter 304 to control the conduction state of associated power MOSFETS within the power electronic inverter drive 304, which gates energy flow to the various phase windings 16 of the SRM 14.

The dilation 138 δ parameter is multiplied by a factor of 0.5 and then is input, along with the translation parameter τ 138, to the turn-on $\theta_{on}$ summer 142, which outputs the optimal turn-on $\theta_{on}$ conduction angle. In similar fashion, the dilation 138 and translation τ 134 parameters are input to the to the turn-on $\theta_{on}$ summer 142, which outputs a numeric value representing the optimal nominal turn-on $\theta_{on}$ conduction angle 141. In similar fashion, the dilation δ and translation τ parameters are input to the to the turn-off $\theta_{off}$ summer 144, which outputs a numeric value representing the optimal nominal turn-off $\theta_{off}$ conduction angle 143. These nominal conduction angle values 141 and 143 are input to multiple phase-shifting circuits 146 that sequentially shift the phase of each of the signals a multiple of 90 degrees (48 encoder counts) to output a series of values 147 representing an ideal optimized turn-on and turn-off angle for each of the four phases of the SRM 14.

The four phase SRM 14 of the preferred embodiment has an optimal Phase A turn-on angle value of hexadecimal 01h and a corresponding optimal Phase A turn-off angle value of hexadecimal 30h for low speed operation at nominal voltage and temperature conditions. The value of the Phase B turn-on angle of the four phase SRM 14 is determined by adding (if clockwise rotation of the rotor 18 is desired) or subtracting (if counterclockwise rotation of the rotor 18 is desired) 90 electrical degrees or hexadecimal value 60h. The value of Phase C and D turn-on angles and the values of the turn-off angles are computed in a similar fashion.

Conduction angle comparator 148 logically compares the measured position of the rotor 20 from rotor position sensor 104 to the turn-on and turn-off angle values for each phase 147 output from the phase-shifting circuits 146 then outputs phase current switching functions 316 [$s_a(t)$, $s_b(t)$ $s_c(t)$ or $s_d(t)$] to the power electronic inverter drive 304. An interrupt service routine that triggers an interrupt signal at each transition pulse output from the incremental rotor position sensor 104 is used to time the comparison operation performed by conduction angle comparator 148. The interrupt signal increments a position counter that cycles from 01h to C0h for clockwise rotation of the rotor 18 or from C0h to 01h for counterclockwise rotation of the rotor 18. At each counter cycle, the conduction angle comparator 148 performs a logical comparison between each of the turn-on and turn-off angle values 147 and the rotor position from rotor position sensor 104 then outputs one of the phase current switching functions [$s_a(t)$, $s_b(t)$ $s_c(t)$ or $s_d(t)$] 316 to the power electronic inverter drive 304 whenever the measured rotor position from the rotor position sensor 104 falls within the range of the optimal conduction angle for any particular phase.

To reduce the number of pulse-width modulators required by the power electronic inverter drive 304 to develop required switching state control signals 317, advantage can be taken of the fact that during normal operation of a SRM 14 only one of any two complementary phases of the SRM 14 is in a high switching state at any one time. A logical comparator 152 is used to perform a logical OR operation on the phase current switching states [$s_a(t)$, $s_b(t)$ $s_c(t)$ or $s_d(t)$] 316 from complementary phases and the result output to a pulse-width modulation comparator 154.

Pulse-width modulation comparator 154 determines which of the switching states [$s_a(t)$ or $s_c(t)$; or $s_b(t)$ or $s_d(t)$] 316 is output 101 to the SRM based on the output from the logical comparator 152, the measured current signals $i_{ac}(t)$ and $i_{bd}(t)$] 314, and the command current signal [$i_{ac}(T_{input}, \theta(t))$ $i_{bd}(T_{input}, \theta(t))$] 320 from torque to current conversion 312 then outputs the required switching state control signal 317 [$s_{ac}(t)$ and $s_{bd}(t)$] to the power electronic inverter drive 304, which controls the delivery of current to each of the phases in the SRM 14. Thus, as operating conditions change, optimum conduction angles are continuously redetermined and updated. In the preferred embodiment, the electronic commutator and current regulator 302 is implemented by software running in the TMS320C240.

The operation of power electronic inverter drive 304 and power MOSFET switched transients are described in U.S. Pat. Nos. 5,637,974 and 5,872,441.

Brake-by-wire systems with controllers for various configurations of SRMs having any number of phases may be implemented using the disclosed new and innovative scheme for controlling a motor by using optimal conduction angles. In addition to the microprocessor-based implementation discussed as the preferred embodiment, the present invention may be implemented using discrete analog and/or digital components or a mixture of analog and digital components and microprocessor technology. Other alternative implementations and minor variations of the disclosed preferred embodiment will be apparent to those skilled in the art and may still properly fall within the scope of the following claims.

I claim:

1. A method for selectively energizing a motor winding, comprising the steps of:
   accepting a first input value related to a requirement for motor output;
   developing translation and dilation parameters based upon said first input value;
   developing a conduction angle value based upon said translation and dilation parameters, said conduction angle value representing the substantially optimal angular position of the rotor of said motor at which to selectively control the delivery of energy to said winding;
   controlling selectively the delivery of energy to said winding based upon said conduction angle value;
   accepting a second input value as a temperature value related to the temperature of said winding; and
   developing said translation parameter based upon said first input value and said second input value.

2. A method for selectively energizing a motor winding, comprising the steps of:
   accepting a first input value related to a requirement for motor output;
   accepting a second input value related to the temperature of said motor winding;
   developing translation and dilation parameters based upon said first and second input values;
   developing a pair of conduction angle values based upon said translation and dilation parameters, each of said conduction angle values representing a substantially optimal angular position of the rotor of said motor at which to selectively control the delivery of energy to said winding
   selectively energizing said winding at a first one of said conduction angle values, and
   selectively de-energizing said winding at a second one of said conduction angle values.

3. A method for selectively energizing multiple stator pole windings for the rotation of a switched reluctance motor, comprising the steps of:
   inputting an output requirement from a system controller representing required motor output;
   inputting a temperature value from a winding temperature sensor representing winding temperature;
   inputting a voltage value based upon a measured supply voltage;
   deriving temperature and voltage error values from said temperature and voltage values;
   determining a translation parameter based upon said temperature and voltage values and said output requirement;
   determining a dilation parameter based upon said output requirement;
   providing circuitry to output a signal representative of the substantially optimal angular position of the rotor of said motor at which to selectively control the delivery of energy to said stator pole windings based upon said translation and dilation parameters; and
   controlling selectively the delivery of energy to at least one of said stator pole windings at said substantially optimal angular position of said rotor.

4. The method of claim 3, said providing circuitry and controlling selectively steps comprising:
   providing circuitry to output a first conduction angle signal representative of the substantially optimal angular position of said rotor at which to selectively energize said stator pole windings based upon said translation and said dilation parameters; and
   selectively de-energizing said stator pole windings at said substantially optimal angular position of said rotor.

5. The method of claim 3, said providing circuitry and controlling selectively steps comprising:
   providing circuitry to output a second conduction angle signal representative of the substantially optimal angular position of said rotor at which to selectively de-energize said stator pole windings based upon said translation and dilation parameters; and
   selectively de-energizing said stator pole windings at said substantially optimal angular position of said rotor.

6. The method of claim 3, further comprising the step of shifting the substantially optimal angular position by multiple predetermined measures to form multiple shifted angular position signals.

7. The method of claim 6, further comprising the step of controlling the delivery of power to successively energize individual stator pole windings of at least two of said multiple shifted angular position signals.

8. The method of claim 6, further providing the step of processing said shifted angular position signals to operate a power circuit.

9. The method of claim 3 wherein said determining a translation parameter step comprising:
   comparing the position of said rotor to a speed reference signal to determine a speed error signal;
   comparing said measured supply voltage to a voltage reference signal to determine a voltage error signal; and
   comparing a rotor temperature signal to a temperature reference signal to determine a temperature error signal.

10. The method of claim 9 wherein said determining a translation parameter step further comprises:
    processing said speed error signal to develop a speed term;
    processing said voltage error signal to develop a voltage term;
    processing said temperature error signal to develop a temperature term; and
    summing said speed, voltage, and temperature terms to produce said translation parameter.

11. The method of claim 9 wherein said determining a dilation parameter step comprising:
    processing said speed error signal to develop a speed dilate term; and
    amplifying said speed dilate term to produce said dilation parameter.

12. An apparatus for selectively energizing a motor winding to spin a rotating member, comprising:
    an output error value generator for generating an output error value representing the deviation of an operating value from a reference value;
    processing circuitry with software control, in communication with said output error value generator, for developing a dilation parameter and a translation parameter based upon said output error value and outputting a conduction angle value representing the substantially optimal angular position of said rotating member at which to selectively control the delivery of energy to said winding; and a temperature sensor, in the vicinity of said winding and in communication with said processing circuitry, that outputs a temperature value representing the temperature of said winding.

13. The apparatus of claim 12, wherein said processing circuitry includes temperature processing circuitry, in communication with said temperature sensor, that compares said temperature value against a reference temperature and generates a temperature error value.

14. The apparatus of claim 12, wherein said processing circuitry includes translation parameter generation circuitry that receives said output error value and said temperature value and determines a translation parameter value.

\* \* \* \* \*